Aug. 16, 1927.

S. A. STAEGE 1,638,890

DYNAMO ELECTRIC MACHINE

Filed April 25, 1924

WITNESSES:
R. J. Butler.
S. M. Pineles

INVENTOR
Stephen A. Staege.
BY
Wesley G. Carr
ATTORNEY

Patented Aug. 16, 1927.

1,638,890

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

Application filed April 25, 1924. Serial No. 708,896.

My invention relates to dynamo-electric machines and it has particular relation to synchronous motors.

One object of my invention is to provide a self-contained unit comprising a stator member and a rotor member of a dynamo-electric machine wherein the rotor member is loosely mounted upon the shaft, and means for effecting a torque transmitting engagement between the rotor member and the shaft.

A more specific object of my invention is to provide a synchronous motor of the above-described character for facilitating the starting of the same when a load is connected to its shaft.

Another object of my invention is to provide a combination of a magnetic clutch and a dynamo-electric machine wherein the dynamo-electric machine supplied the necessary force for releasing the magnetic-clutch members after the same are de-energized.

My invention has particular application in connection with the starting of synchronous motors as it permits a rigid connection between the shaft of the motor and the load and does not interfere with the starting of the motors. While I am aware that magnetic clutches have been used to provide a torque-transmitting connection between the shaft of a synchronous motor and the loaded shaft, I am not aware of any construction which combines the clutch mechanism with the motor itself within the very small space of the motor, and provides a self-contained operative unit.

In its broad aspect, however, my invention is not confined to synchronous motors but may be used in connection with any other machine wherein the same solution contributes to a simple and compact construction of a torque-transmitting device.

Figure 1:
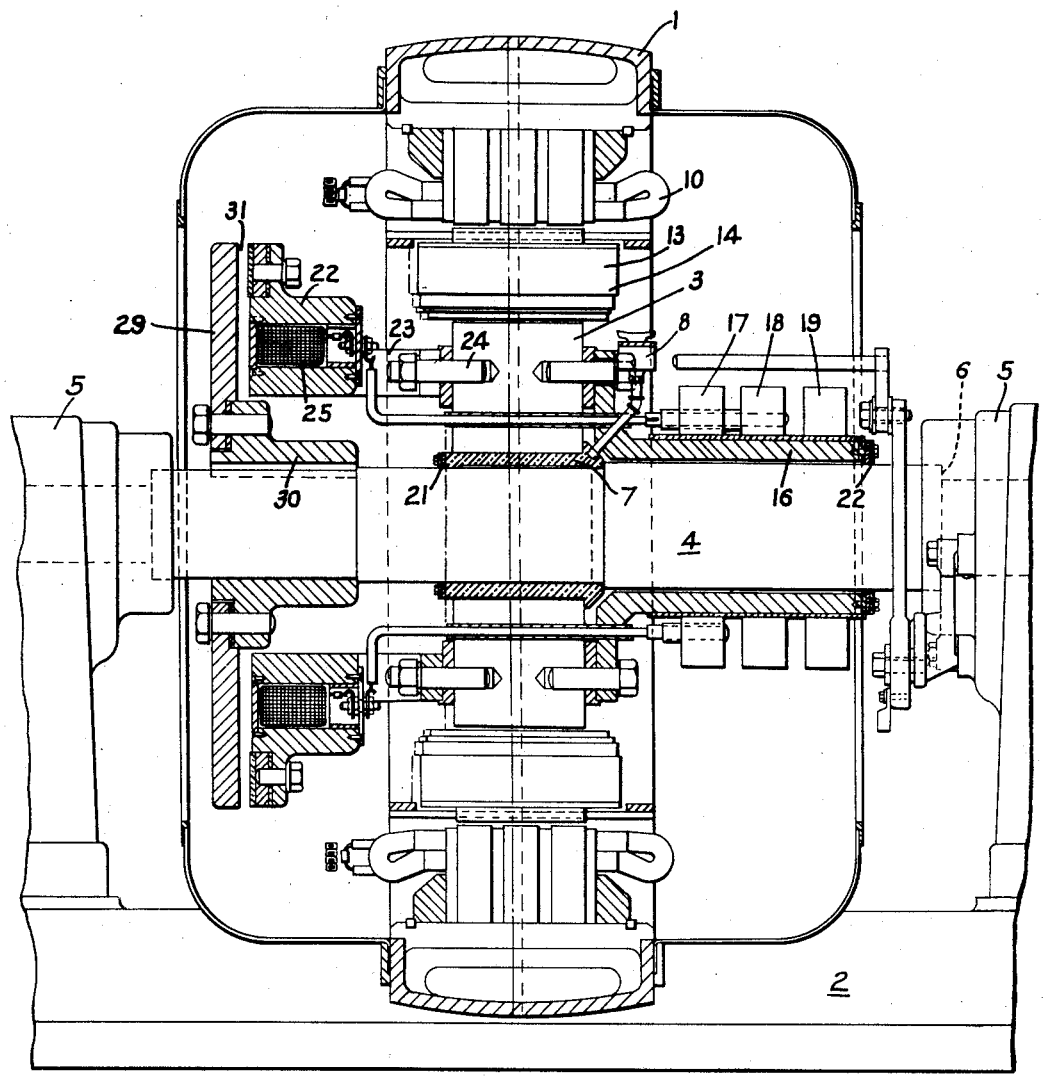

The foregoing and other objects of my invention will be best understood by reference to the accompanying drawing, wherein:

Figure 1 is a sectional view of a synchronous motor embodying my invention, and

Figure 2:
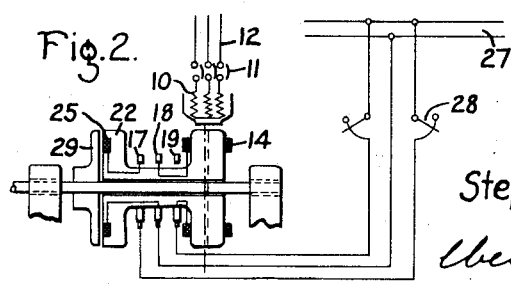

Fig. 2 is a diagrammatic view showing the electrical connections of the motor illustrated in Fig. 1, A synchronous motor has a stator member 1, which is mounted upon a bed plate 2 and a rotor member 3 which is loosely mounted upon a shaft 4. The shaft is supported by two pedestal bearings 5 secured upon the bed plate 2 and is provided with thrust bearings 6 for preventing axial movement of the shaft.

The hub of the rotor member constitutes a bearing 7 surrounding a central portion of the shaft and that may be lubricated by means of a lubricating device 8. In the particular construction shown in the drawing, the stator has an alternating-current armature winding 10 which is connected through suitable switches 11 to an alternating-current supply line 12, and the rotor is provided with salient pole members 13 carrying direct-current exciting windings 14. The rotor is provided on one side with a cylindrical extension 16 which constitutes an additional bearing surface for the rotor member and is lubricated from the same lubricating device 8 as the main bearing 7 of the rotor member. The cylindrical extension 16 carries slip rings 17, 18 and 19, two of the slip rings, 18 and 19, leading to the direct-current exciting windings 14, the third slip ring serving in combination with one of the other slip rings for a purpose to be described hereinafter. In order to prevent the lubricant from running out of the bearing, washers 21 and 22 tightly enclose the end surfaces of the bearing members.

The other side of the rotor member 3 has mounted thereon a clutch field member 22 of a magnetic clutch of familiar design. The clutch member 22 is carried by spokes 23 and a hub secured to the rotor member by means of screw bolts 24 and is provided with an energizing field winding 25 which is supplied through the slip rings 17 and 18 from a direct-current line 27 through a switch or rheostat 28. Cooperating with the field member 22 of the clutch is a disc shaped armature member 29 which is rigidly secured upon the shaft 4 by means of a hub 30.

In the usual operation of magnetic clutches in general, the two clutch members are forced into close contact with each other by the energizing current, the driving clutch member carrying the driven clutch member by the traction exercised thereon by frictional contact. In the practical construction of magnetic clutches, it has been found necessary to provide means for combatting the effect of the residual magnetism of the clutch members, or "freezing" which often keeps the same together even after the actuating coil is de-energized, causing considerable undesirable friction between the clutch members when the clutch members should be disengaged. To avoid these difficulties, it is usual to so bias the two members with respect to each other that, when de-energized, a small gap is provided between the same. In the ordinary construction the disc armature which is attracted by the field member is mounted upon a flexible spring plate, the elasticity of the plate permitting the disc to come into close contact with the field member when energized and separating the disc from the field member by a small air gap when de-energized.

In my construction, I entirely avoid the use of the spring members, the disc armature 29 being rigid and the connection between the disc armature and the shaft 4 being also rigid. In order to provide for the gap between the two clutch members, I permit a small longitudinal movement of the rotor member corresponding to the gap 31 between the two clutch members 22 and 29. This gap is shown exaggerated and in the actual construction does not amount to more than one-sixteenth or one-eighth of an inch.

In the operation, with the field member 22 de-energized and the motor energized, the rotor member 13 will be drawn into a position in alinement with the stator member 1. If the actuating coil 25 of the magnetic clutch member 22 is now energized, the rotor member will be drawn out of the position of alinement with the stator member until the two clutch members come into contact, the rotor being now in a position to pick up the load which is connected to the shaft 4. With this arrangement, the motor continues to operate under load with the rotor member off center by the amount of the air gap 21 between the two clutch members. When it is desired to release the load, the clutch is de-energized and the magnetic pull of the stator forces the rotor member toward the center thereby providing the gap which is necessary for successful operation of the magnetic clutch.

To start the motor from rest, with the load connected to the shaft, the clutch is de-energized and the motor started as if no load were connected thereto. After the loose rotor 3 comes up to synchronism, the clutch is energized, bringing the shaft and the load which is connected thereto up to synchronous speed. The energizing switch or rheostat 28 of the magnetic clutch may be suitably arranged to gradually energize the clutch in order to suit the particular conditions of operation.

By combining the magnetic clutch and the rotor member of the motor, much space is saved which would otherwise be necessary if the clutch were used externally of the motor. As a further advantage of my improved construction, at least one or two bearings, which would otherwise be necessary to support the extending shaft, are eliminated. A still other very important advantage of my improved construction is that the magnetic clutch is always in perfect alinement and does not require any further attention in the assembling of the equipment since magnetic clutches, and friction clutches in general, require a very accurate alinement for successful operation and such alinement is the more difficult the less rigid and definite the connection between the various parts.

In the practical construction, a motor built according to my invention requires little or no lengthening of the present size of the motor frame and there are practically no changes in the motor construction. In its particular application to synchronous motors, I secure all the advantages of synchronous motors such as power-factor correction, etc., while securing a starting torque equal to the pull-out torque of the motor with practically no change in the external dimensions or mode of operation of the same.

While I have described the particular application of my invention to synchronous motors and desire that such application should be regarded as a distinct feature of my invention, I do not wish to be altogether limited thereto since the same may be applied in many other industrial applications, such as in reducing the starting current of squirrel-cage motors, for instance and the appended claims are intended to cover all such modifications as fall within the spirit of my invention.

I claim as my invention:

1. A dynamo-electric machine comprising a shaft member, a rotor member mounted loosely upon said shaft member for free rotary and axial movement, a stator member surrounding said rotor member, and means for so axially moving said rotor member for providing a torque transmitting engagement between said rotor member and said shaft as to bring said rotor member out of electrical alinement with said stator member.

2. A dynamo-electric machine comprising a shaft member, a rotor member mounted loosely upon said shaft member for free rotary and axial movement, a stator member surrounding said rotor member, a magnetic clutch comprising a member carried by said rotor member and a cooperating member secured to said shaft, said rotor member being axially movable between a position in which said clutch members are engaged and a position corresponding to the magnetic alinement of said rotor member and stator member, and means for energizing said clutch.

In testimony whereof, I have hereunto subscribed my name this eleventh day of April, 1924.

STEPHEN A. STAEGE.